Patented Jan. 4, 1949

2,458,451

UNITED STATES PATENT OFFICE 2,458,451

METHOD OF FORMING NONTHERMOPLASTIC SYNTHETIC RESIN FILMS

Gordon T. Vaala, Wilmington, Del., assignor to E. I. du Pont de Nemours & Company, Wilmington, Del., a corporation of Delaware No Drawing. Application June 18, 1943,
Serial No. 491,400

5 Claims. (Cl. 117—65)

This invention relates to new heat curable plastic compositions and in particular to the preparation of nonthermoplastic sheet material by forming and curing these plastic compositions.

Synthetic resins to be useful as coating compositions or for the formation of shaped articles must be soluble or sufficiently thermoplastic to permit application or fabrication. However, it is generally undesirable for the resin to remain permanently soluble or thermoplastic after fabrication because it cannot then be used in articles which are exposed to high temperatures or which come in contact with liquids which are solvents for the polymeric material. In the manufacture of shaped articles such as unsupported sheeting or coated fabrics by calendering it is essential that the polymeric material become plastic and workable at some elevated temperature. However, if the material remains permanently thermoplastic it will again become soft, plastic and subject to damage whenever it is heated to a temperature as high as or higher than the original forming temperature. Furthermore, if the polymeric material is soluble as most thermoplastic resins are, it is not suitable for use where it will come in contact with solvents. For these reasons it is highly desirable to use heat-curable resins which are initially sufficiently thermoplastic to permit forming but which become insoluble and non-thermoplastic when the final article is baked at an appropriate elevated temperature.

The number of polymeric materials which can be cured is, unfortunately, extremely limited. In the field of molded articles the thermosetting urea-formaldehyde and phenol-formaldehyde resins, which are initially sufficiently plastic to permit molding but become insoluble and non-thermoplastic during molding, are greatly preferred over non-thermosetting resins for the preparation of articles which must withstand high temperatures or contact with solvents. However, these resins cannot be pliabilized sufficiently with plasticizers to make them suitable for flexible articles. Even as molding compositions their brittleness, opacity, and in some cases their color are serious disadvantages. Rubber and synthetic rubbers have been the principal materials used where flexible articles or coatings capable of being cured by heat have been required. The great advantage of rubber for many uses is that it can be compounded with the materials required for vulcanization and subsequently milled, calendered, extruded or otherwise formed without premature curing of the composition during these operations. The rubber article or coating can then be cured with heat to render it insoluble and non-thermoplastic. In many respects, however, rubber is inferior to thermoplastic resins. It has poor age resistance, especially at high temperatures, and in the presence of ozone or when exposed to sunlight. Pigmented rubber compositions show poor resistance to crocking which is the tendency for the pigment to be rubbed off the surface. Furthermore, rubber is badly swollen by oils, greases and hydrocarbon solvents. Its color makes it unsuitable for use in transparent or light but bright colored objects.

Methods have been proposed for curing synthetic polymeric materials which contain functional groups such as hydroxyl, amino, carboxyl and amide groups. This is accomplished by reacting the polymeric material with an agent which is capable of reacting with two or more of the reactive groups present in the polymer. For example, diisocyanates such as hexamethylene diisocyanate have been proposed for curing polymeric materials containing hydroxyl groups. Due to the extreme reactivity of the diisocyanate, curing occurs at room temperature and very rapidly at slightly elevated temperatures. Polymerized dimethylolurea is known to insolubilize polyvinyl alcohol at temperatures as low as 50° C. Other agents which have been proposed for insolubilizing or reducing the thermoplasticity of polymeric materials containing hydroxyl groups are formaldehyde, dichlorodioxane, and acid chlorides or anhydrides of dibasic acids. Although these agents have increased somewhat the utility of certain polymeric materials containing hydroxyl groups, they are of very limited use with polyvinyl acetals. Certain of the agents such as chlorides and anhydrides of dibasic acids and dichlorodioxane which are acidic or liberate acidic materials cause degradation of polyvinyl acetals. Moreover, most of the agents cause insolubility and reduction of thermoplasticity at such low temperatures as to be unsuitable for many uses. In the calender coating of fabrics, for example, the resin is compounded by milling with plasticizers, pigments and other ingredients and is then applied to a fabric base by means of calendering rolls. To accomplish this the resin must be maintained at a temperature at which it is plastic or calenderable. Compositions which cure at low temperatures are not suitable for use since a satisfactory coating cannot be obtained if curing occurs during compounding or calendering. When calender-coated fabric or unsupported calendered sheeting is produced on a large scale, it is desirable to use a composition which does not cure even when heated at a temperature somewhat higher than the normal calendering temperature for a period somewhat longer than is normally required for calendering. Although the calendering operation is rapid and much of the composition may be heated for only a short time, small amounts of material may roll for a considerable time in the nip of the calender rolls. If this small amount of composition begins to cure before passing through the mill it produces a rough spot or hole in the product. During operation the temperature of the mills may be inadvertently raised several degrees above the normal operating temperature and the composition should not cure under these conditions. Furthermore, whenever operation must be interrupted part of the composition is unavoidably heated for a longer time. Compositions which calender satisfactorily during normal operation often cure prematurely under these conditions.

In many respects the acetals of polyvinyl alcohol are superior to any of the known hydroxylated thermosetting resins. They are easily plasticized to yield compositions varying widely in pliability. Their clarity and absence of color permits their use in articles which are transparent or opaque and which are either colorless or colored. Furthermore, these polyvinyl acetal resins are superior to rubber in their resistance to aging and crocking and are not affected by oils, greases, or hydrocarbon solvents. In the uncured state, however, polyvinyl acetal resins have the disadvantages just mentioned.

The object of this invention is to provide a thermosetting polyvinyl acetal plastic composition which can be formed by calendering, extruding, molding or casting from solution and can subsequently be baked to render the formed article insoluble and non-thermoplastic. Another object is to provide formed articles of non-thermoplastic insoluble polyvinyl acetals.

These objects are accomplished by mixing at a temperature below that at which curing takes place, a polyvinyl acetal resin having a hydroxyl number of at least 60 with a smaller amount. i. e. between about 1% and 90% based on the weight of the resin, of a melamine-formaldehyde-alcohol reaction product, forming the plastic mixture into the desired form by calendering, extruding, or other forming method and subsequently baking the formed material at a temperature of at least 100° C. but below about 200° C. to render the polyvinyl acetal insoluble and non-thermoplastic.

It has been found that compositions comprising a thermoplastic polyvinyl acetal and a smaller amount of a melamine-formaldehyde-alcohol reaction product such as an alcohol-modified melamine-formaldehyde resin or a tri-(alkoxymethyl) melamine can be formed into shaped articles by calendering, extruding, molding, or casting from solution. The products like untreated polyvinyl acetal compositions are soluble and readily thermoplastic. However, if the shaped article is cured by baking for two hours at 120° C. the polyvinyl acetal resin becomes insoluble and non-thermoplastic.

The polyvinyl acetal resins suitable for use are the acetals of hydrolyzed (or partially hydrolyzed) polyvinyl esters. The term "acetal" as used herein includes the very closely related ketals. Although these resins may differ in the aldehyde or ketone used in the acetalization (or ketalization), the degree of hydrolysis of the polyvinyl ester, and the degree of acetalization or ketalization, they are suitable for use in this invention provided they have hydroxyl numbers of at least 60. Since the rate of curing increases with increasing hydroxyl number, a low hydroxyl polyvinyl acetal is used when a slow rate of curing is desired and a high hydroxyl polyvinyl acetal is used to prepare compositions which must cure more rapidly or at slightly lower temperatures. Polyvinyl acetals having hydroxyl numbers below 200 are preferred for calendering or extruding since they do not cure too rapidly to be formed by these methods.

Hydroxyl number is defined as the number of milligrams of potassium hydroxide required to saponify the ester groups produced by completely esterifying one gram of the polymeric material.

The hydroxyl number can be determined directly by esterifying a weighed amount of completely esterified polymer and determining the amount of alkali required to saponify the product, but, since the original polymer, i. e. the polymer before esterification, may also contain saponifiable groups, the value so obtained must be corrected by subtracting the saponification number of the original polymer. It is usually more convenient to determine hydroxyl numbers by the method of Smith and Bryant, J. Am. Chem. Soc. 57, 61 (1935). In this method, a weighed sample of the original polymer is acetylated with excess acetyl chloride and the amount of acetyl chloride consumed is determined by titration.

The melamine-formaldehyde-alcohol reaction products may be the low molecular weight alcohol-modified melamine-formaldehyde resins such as those described by Widmer in U. S. Patent 2,197,357, the crystalline tri-(alkoxymethyl) melamines described by McGrew in copending patent application Serial No. 387,771, filed April 9, 1941, now abandoned or the hexa-(alkoxymethyl) melamines.

The invention is illustrated by the following examples. All parts are by weight.

*Example I*

A coating composition is prepared from the following ingredients as is described below:

| | Parts |
|---|---|
| Polyvinyl butyral (hydroxyl number 160) | 100 |
| Castor oil | 23.6 |
| Hydrogenated castor oil | 14.3 |
| Tri(ethoxymethyl) melamine | 9.9 |
| Beta-phenyl-beta-bromopropionic acid | 4.0 |
| Whiting | 54.7 |

The polyvinyl butyral, castor oil, and hydrogenated castor oil are swollen with 200 parts of acetone and the resulting mixture is milled on a warm rubber mill until it is free of solvent. The other ingredients are then milled into the composition. This composition is calendered onto unsupported plastic sheeting between rolls heated at about 60° C. The sheeting is cured by baking for 90 minutes at 117° C. The mar point, which is the minimum temperature at which the film is permanently deformed by a standard stress, is above 180° C. It is unaffected by boiling water and retains the pliability of the uncured sheeting. Another sample of sheeting which was prepared in the same way except that the tri-(ethoxymethyl) melamine was omitted became soft and sticky and lost its shape when placed in boiling water. It marred at 60° C. in the mar point test.

*Example II*

A coating composition is prepared from the following materials as is described below:

| | Parts |
|---|---|
| Polyvinyl butyral (hydroxyl number 159) | 100 |
| Di(butoxyethyl) sebacate | 40 |
| Dibutylammonium oleate | 5 |
| A 50% solution of butanol-modified melamine-formaldehyde resin | 22 |
| Crown clay | 75 |
| Carbon black | 1 |

The polyvinyl butyral, di(butoxyethyl) sebacate, dibutylammonium oleate, and the butanol-modified melamine-formaldehyde resin are mixed with 100 parts of denatured alcohol and allowed to stand for several hours. The composition is then milled on a warm rubber mill until it is free of solvent and then the Crown clay and carbon black are milled into the composition. This plastic composition is calendered into unsupported sheeting between rolls heated at about 60° C. and is then cured for 2 hours in an oven at 122–123° C. The cured plastic sheeting is insoluble in acetone and ethyl alcohol, is unaffected by boiling water and does stick to itself when folded on itself and heated to 200° C. In the cold crack test in which a sample is folded under a standard impact, the film does not crack at −15° C. Another sample of sheeting which is prepared in the same way except that the alcohol-modified melamine-formaldehyde resin is omitted becomes soft and sticky and loses its shape when placed in boiling water. When folded and heated at 200° C. the surfaces fuse together so completely that they cannot be pulled apart without severe damage to the film.

The alcohol-modified melamine-formaldehyde resin of Example II may be prepared by reacting melamine, formaldehyde and an excess of butanol as is described by Widmer in U. S. Patent No. 2,197,357, Example 9.

*Example III*

The following materials are mixed together and agitated until a homogeneous solution is formed:

| | Parts |
|---|---|
| Polyvinyl butyral (low viscosity, hydroxyl number 260) | 70 |
| Polyvinyl butyral (high viscosity, hydroxyl number 155) | 30 |
| 50% solution of butanol-modified melamine-formaldehyde resin in butanol | 22 |
| Butyl acetate | 32 |
| Denatured alcohol | 380 |

One part of this composition is thinned with five parts of denatured alcohol and applied with a brush to 1/16" birch plywood veneer. Two coats are applied to one surface of each of the outer-plies and to both surfaces of the center ply and allowed to dry. The coated veneer is then laminated by the conventional bag process using an autoclave at a gauge pressure of 50 lbs. per sq. in. (steam and air) at 127° C. for 1½ hours. The lamination has a shear strength of 545 lbs. per sq. in. and after 3 hours in boiling water it has a shear strength of 333 lbs. per sq. in. Another sample of laminated plywood prepared in the same manner except that no butanol-modified melamine-formaldehyde resin is used has an initial shear strength of 510 lbs. per sq. in. and 281 lbs. per sq. in. after 3 hours in boiling water.

The following example illustrates the use of the invention in preparing insulated wire. It is equally applicable to making condensers and similar insulated articles.

*Example IV*

A mixture of 100 parts of polyvinyl butyral (hydroxyl number 155), 28 parts of a 50% solution of butanol-modified melamine-formaldehyde resin and 800 parts of denatured ethyl alcohol is agitated until a homogenous composition is formed. Copper wire (No. 28) is passed through this composition, then through a wiping die which removes excess coating composition. After a brief period of air drying, the coated wire is heated in an oven at 155° C. for 20 minutes, after which treatment the coating is insoluble in alcohol. It adheres firmly to the wire and it is not cracked when the wire is kinked or stretched quickly.

In coating wire with the resins described herein, high curing temperatures (as high as 300° C.) may be used, with a correspondingly reduced time of cure. High curing temperatures are desirable since a rapid cure permits coating and curing in one operation in a conventional wire enameling machine.

The polyvinyl acetals (which term is used generically to embrace the acetals and ketals) suitable for use in this invention are prepared by reacting completely or partially hydrolyzed polyvinyl esters, as described, for example, in U. S. Patent No. 2,036,092 or U. S. Patent No. 2,162,178 with any desired aldehyde or ketone. Examples of such aldehydes or ketones are formaldehyde, acetaldehyde, propionaldehyde, butyraldehyde, isobutyraldehyde, n-hexylaldehyde, n-octylaldehyde, benzaldehyde, cinnamaldehyde, cyclohexylaldehyde, acetone, methyl ethyl ketone, di-n-butyl ketone, acetophenone, cyclohexanone, etc. The lower alkyl aldehydes, i. e. those having less than 8 carbon atoms, are preferred. The choice of the polyvinyl ester to be partially or completely hydrolyzed is immaterial. Polyvinyl acetate is the most readily available of these esters, but other esters such as polyvinyl propionate, polyvinyl butyrate or mixed esters such as polyvinyl acetate-propionate are also suitable.

Since a considerable number of hydroxyl groups are required for curing, the polyvinyl acetals should have hydroxyl numbers of at least 60. The choice of polyvinyl acetal resins will, of course, depend upon the means used to form the article to be manufactured. Since milling, calendering, and extruding require that the composition be heated for a considerable time at a temperature at which it becomes plastic or workable, it is essential that no curing occur at temperatures required for these operations. Therefore, a polyvinyl acetal having a hydroxyl number between 60–275 is used for compositions which are to be formed in this manner. Polyvinyl acetals having hydroxyl numbers below 200 are preferred for these applications since they show less tendency to cure during calendering or extruding. Those having hydroxyl numbers of 166 or less are particularly preferred since they are substantially free of tendencies to cure prematurely during forming. Polyvinyl acetals having hydroxyl numbers above 120 form articles which after curing are less thermoplastic and have better solvent resistance than those formed from polyvinyl acetals of lower hydroxyl number. The polyvinyl acetals which are especially preferred for calendering or extruding are, therefore, those having hydroxyl numbers between about 121 and 166. In molding, on the other hand, the plastic conforms quickly to the mold when heat and pressure are first applied. No harm is done, therefore if some curing occurs during the later stages of the molding cycle. Rapid curing is in fact usually desirable in this case since long heating either in the mold or following the molding process is then unnecessary. Consequently it is possible to use polyvinyl acetals having considerably higher hydroxyl numbers for molding than can be successfully calendered or extruded. Similarly when articles are formed or coatings are applied from a solution of the plastic composition, premature curing presents no problem. The use of a polyvinyl acetal having a high hydroxyl number may then prove desirable since the temperature and time required for curing is in this way reduced.

The melamine-formaldehyde-alcohol reaction products may be the alcohol-modified melamine-formaldehyde resins of the type described by Widner in U. S. 2,197,357. The ratio of formaldehyde to melamine should be at least 2.5 to 1. Any aliphatic alcohol may be used to prepare these resins but those having 6 or less carbon atoms are preferred. Instead of the alcohol-modified melamine-formaldehyde resins, the tri (alkoxymethyl) melamines such as tri (methoxymethyl) melamine or tri (ethoxymethyl) melamine described by McGrew Serial No. 387,771 may be used. The amount of melamine-formaldehyde-alcohol reaction product depends upon the polyvinyl acetal resin used, the degree of curing desired, the margin of safety against premature curing required, and the temperature and time of curing to be used as well as upon the type of melamine-formaldehyde-alcohol reaction product. In general, somewhat higher concentrations of alcohol-modified melamine-formaldehyde resins are required than of the tri (alkoxymethyl) melamines. Somewhat higher concentrations of curing agent are required if a plasticizer which contains hydroxyl groups is used since then the plasticizer will consume some of the curing agent. The amount of curing agent (on a solids basis) should be at least 1% of the weight of the polyvinyl acetal resin and should not exceed the weight of the polyvinyl acetal resins. Preferably the amount of curing agent should be between 3–40% of the weight of the polyvinyl acetal resin.

Although the curing action takes place readily in the absence of a catalyst it is sometimes desirable to add an acidic catalyst to reduce the temperature or time required for curing, such materials include beta-phenyl-beta-bromopropionic acid, ammonium chloride and phosphoric acid.

The plasticizer suitable for use in this invention are the ones which are commonly used with the polyvinyl acetal resins in the absence of the curing agent. For example, plasticizers suitable for use with polyvinyl acetal resins and particularly suitable for polyvinyl butyral included sebacates such as dibutyl sebacate, di (methoxyethyl) sebacate, and di (butoxyethyl) sebacate; phthalates such as di (methoxyethyl) phthalate, di (ethoxyethyl) phthalate, di (butoxethyl) phthalate, methylphthalyl methyl glycolate, butylphthalylbutyl glycolate and the dialkylphthalates of alcohols containing 8 or less carbon atoms; other esters such as butoxyethyl stearate, triethylene glycolate di (2-ethylbutyrate), hydrogenated methyl abietate; oils such as castor oil, blown castor oil, bodied castor oil, linseed oil, blown linseed oil, blown corn oil, and blown cottonseed oil; phosphates such as tricresyl phosphates, triphenyl phosphate, and tri (tert.-butyl phenyl) phosphate; chlorinated hydrocarbons such as chlorinated diphenyl. Unsaturated hydrocarbons described in U. S. 2,217,919 and known to the trade as Naftolen may also be used. Soft polymeric materials such as alkyd resins and factices are also suitable for use.

Materials suitable for use as pigments or fillers in the compositions of this invention include in addition to color pigments, whiting, ground mica, clay, lithopone, barytes, zinc oxide, magnesium carbonate, magnesia, titanium oxide, carbon black, graphite, ground leather and ground cellulosic materials. Certain pigments such as Crown clay improve the scratch resistance of the cured compositions and also increase the rate of curing. Graphite and carbon black are superior to the other fillers listed for compositions which must be resistant to high temperature steam.

The methods of compounding the compositions may be varied both with the polymer used and with the equipment available. It is sometimes desirable in preparing compositions for calendering to swell the polyvinyl acetal resin with a small amount of solvent in the presence of the plasticizer. Compounding and solvent removal can then be completed on a rubber mill or in an internal mixer of the Banbury or Werner and Pfleiderer type. The materials may also be compounded without solvent by mixing the powdered dry polymer with the plasticizer in a Werner and Pfleiderer mixer and subsequently colloiding by heating either in the same mixer or by passing through an internal screw-type mixer such as a Royle strainer. Pigments and the curing agent in this case may be added either during the initial mixing of the polymer and plasticizer, during the colloiding, or on a rubber mill after colloiding of the composition.

The compositions of this invention may be applied as coating compositions to fabric, paper, wood, and metal by calendering or extruding at temperatures below about 100° C. They may also be calendered into unsupported sheeting or extruded as tubing or tape. Solutions of these compositions may also be cast into films, spun into filaments or used to coat fabric or other cellulosic materials such as paper and wood or used as adhesives.

The formed articles can be cured by heating in an oven, in a mold, or press or by contact with a heated surface. Films or coated fabrics which are to be embossed may be cured in a press during the embossing treatment. In general, satisfactory curing occurs when the product is baked in an oven for 1–3 hours at temperatures of 105° C.–125° C. The longer time is required at the lower temperature. Higher temperatures up to 160–170° C. may be used with correspondingly shorter curing schedules. Certain of the compositions prepared for polyvinyl acetals having high hydroxyl numbers may be cured at temperatures as low as 80° C. if the length of time is sufficiently increased. In many cases it is advantageous to postpone curing of the composition until further fabrication processes are completed. For example, when coated fabric is to be used to manufacture raincoats or other articles requiring seaming; the coated fabric is usually not cured until after the seams have been cemented. Solutions containing a polyvinyl acetal resin and a melamine-formaldehyde-alcohol reaction product may be used as cements for cementing the seams. Cements adhere better to the uncured composition and when the curable cement is used the coating and seams are all cured at once by baking the final product. In a similar way it is possible to make heat-sealed seams with uncured coated fabric which can then be cured by baking the final article.

The compositions of this invention can be used for the manufacture of coated fabrics or unsupported sheeting to be used in the manufacture of raincoats, shower curtains, refrigerator bowl covers and bags, hot water bottles, hospital sheeting, baby carriage tops, baby bathinettes, upholstery, covers for footballs, basketballs, volley balls, and other sporting goods, luggage, gaskets, gas masks, dugout curtains, collapsible lifeboats and pontoons. Molded articles which can be prepared from these plastic compositions include heels and soles of shoes, balls, electrical insulation, stoppers, fruit jar rings and gaskets. Solutions of these compositions are useful as adhesives for fabric, paper, wood, glass, metal and for articles composed of hydroxyl-containing resins. The compositions are particularly useful as adhesives for laminating plywood, such as is used in the building industry and in the construction of airplanes and motor boats.

It is apparent that many widely different embodiments of this invention may be made without departing from the spirit and scope thereof, and therefore, it is not intended to be limited except as indicated in the appended claims.

I claim:

1. The process of preparing sheet material which comprises mixing a polyvinyl butyral resin having a hydroxyl number above 60 with a melamine-formaldehyde-alcohol condensation product at about 60° C., forming a solvent free mass thereof into a sheet, and thereafter rendering the composition non-thermoplastic and insoluble by heating the same for 1 to 3 hours at a temperature of 105 to 125° C.

2. The process of claim 1 in which the polyvinyl butyral resin has a hydroxyl number between 121 and 166.

3. The process of claim 1 in which the melamine-formaldehyde-alcohol condensation product is present in amount between 3 and 40% of the weight of the polyvinyl butyral resin.

4. The process of claim 1 in which the sheeting comprises calendering the mass into an unsupported film.

5. The process of claim 1 in which the sheeting comprises calendering the mass onto a fabric.

GORDON T. VAALA.

REFERENCES CITED

The following references are of record in the file of this patent:

UNITED STATES PATENTS

| Number | Name | Date |
| --- | --- | --- |
| Re. 20,430 | Morrison | June 29, 1937 |
| 2,197,357 | Widmer | Apr. 16, 1940 |
| 2,243,560 | Hall et al. | May 27, 1941 |
| 2,277,083 | Dorough | Mar. 24, 1942 |
| 2,326,698 | Swain | Aug. 10, 1943 |
| 2,396,098 | Haas | Mar. 5, 1946 |

OTHER REFERENCES

Du Pont Technical Data Bulletin, February 12, 1942, issued by Electro-Chemicals Dept., Du Pont, Wilmington, Del.

Certificate of Correction

Patent No. 2,458,451. January 4, 1949.

GORDON T. VAALA

It is hereby certified that errors appear in the printed specification of the above numbered patent requiring correction as follows:

Column 7, line 74, for "butoxethyl" read *butoxyethyl*; column 8, line 69, for the words "prepared for" read *prepared from*;

and that the said Letters Patent should be read with these corrections therein that the same may conform to the record of the case in the Patent Office.

Signed and sealed this 14th day of June, A. D. 1949.

[SEAL]

THOMAS F. MURPHY,
*Assistant Commissioner of Patents.*